United States Patent [19]

Enders et al.

[11] 3,821,204
[45] June 28, 1974

[54] 2-ARYLIMINOPYRROLIDINES AND THEIR PRODUCTION

[75] Inventors: Edgar Enders, Cologne; Wilhelm Stendel, Wuppertal-Elberfeld; Jurgen-Dietrich Meier, Cologne; Marc Francque, Monheim, all of Germany

[73] Assignee: Farbenfabriken Bayer Aktiengesellschaft, Leverkusen, Germany

[22] Filed: Sept. 17, 1971

[21] Appl. No.: 181,613

[30] Foreign Application Priority Data
Sept. 19, 1970 Germany............................ 2046413

[52] U.S. Cl. 260/240 F, 260/326.5 FL, 260/326.5 L, 260/326.82, 260/326.85, 424/274
[51] Int. Cl. .......................................... C07d 27/04
[58] Field of Search .................... 260/326.85, 240 F

[56] References Cited
FOREIGN PATENTS OR APPLICATIONS
6,903,653    12/1969    South Africa
OTHER PUBLICATIONS
Enders et al., Chemical Abstracts, Vol. 73; 14673r (1970), Abs. of S. Afr., 6903653.

Primary Examiner—Joseph A. Narcavage

[57] ABSTRACT

2-Phenyliminopyrrolidines of the formula:

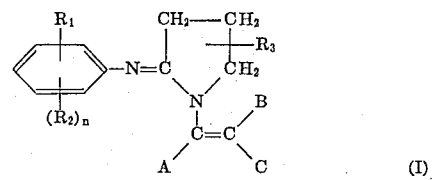

or salts thereof,
wherein
  $R_1$ is halogen,
  $R_2$ is hydrogen, halogen, alkyl of 1 to 6 carbon atoms, difluoromethyl or trifluoromethyl,
  $R_3$ is hydrogen or alkyl, preferably lower alkyl,
  $n$ is an integer from 1 to 4, and
  A, B and C each represent hydrogen, alkyl of 1 to 6 carbon atoms, alkenyl of 2 to 6 carbon atoms, or A and B, or B and C are linked to each other to form a ring, provided that at least one of A, B and C is alkyl or alkenyl,
are useful as acaricides.

59 Claims, No Drawings

2-ARYLIMINOPYRROLIDINES AND THEIR PRODUCTION

The present invention relates to certain new 2-phenyl-iminopyrrolidines, to a process for their production, to acaricidal compositions and to their use as acaricides, especially in combating animal ectoparasites.

More particularly, the compounds of the present invention are 2-phenyliminopyrrolidines of the formula:

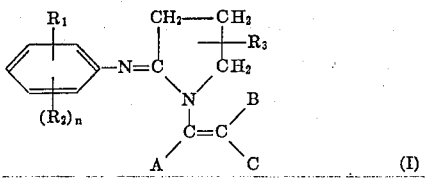

and salts thereof,
wherein
$R_1$ is halogen,
$R_2$ is hydrogen, halogen, alkyl of 1 to 6 carbon atoms, difluoromethyl or trifluoromethyl,
$R_3$ is hydrogen or alkyl, preferably lower alkyl,
$n$ is an integer from 1 to 4, and
A, B and C each represent hydrogen, alkyl of 1 to 6 carbon atoms, alkenyl of 2 to 6 carbon atoms, or A and B, or B and C are linked to each other to form a ring, provided that at least one of A, B and C is alkyl or alkenyl, These compounds exhibit strong acaricidal properties and are therefore useful for combating animal ectoparasites from the class of the acarids.

The compounds according to the present invention may be produced by condensing an arylamine of the formula:

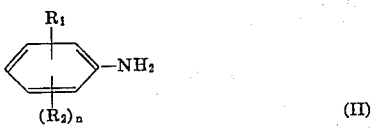

wherein
$R_1$, $R_2$ and $n$ are as above defined,
with a pyrrolidone of the formula:

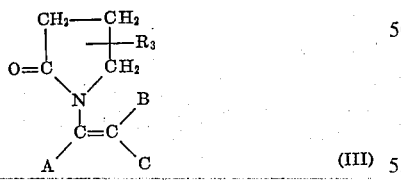

wherein
$R_3$, A, B and C are as above defined,
in the presence of an agent which splits off water. The compounds of the present invention may, for example, be isolated in the form of their salts with hydrohalic acids or in the form of the free bases which may then be converted into suitable salts if desired.

The condensation of 2,4-dichloroaniline and N-isobutenyl-pyrrolidone can be represented by the following equation:

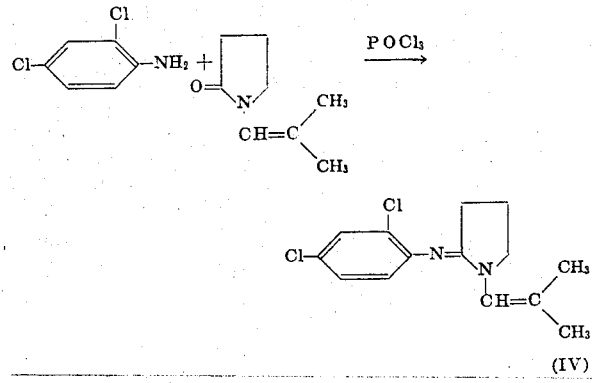

The arylamines defined by the formula (II) are known. $R_1$ is preferably chlorine, bromine or fluorine. When $R_2$ is halogen, it is preferably chlorine, bromine or fluorine; when it is alkyl, it is preferably methyl or ethyl.

Examples of arylamines of formula (II) include: 2-, 3- and 4-chloroaniline, 2-, 3- and 4-bromoaniline, 2,4-dichloroaniline, 3,4-dichloroaniline, 2,3-dichloroaniline, 2,5-dichloroaniline, 2,4,5-trichloroaniline, 2,4,6-trichloroaniline, 3,4,5-trichloroaniline, 4-fluoro-3-chloro-aniline, 4-fluoro-2-bromo-aniline, 2-chloro-4-bromo-aniline, 4-chloro-2-bromo-aniline, 2,4-dibromo-aniline, 4-bromo-2-methyl-aniline, 2,5-dichloro-4-bromo-aniline, 4,5-dichloro-2-bromo-aniline, 2-fluoro-4-bromo-aniline, 2,3,4-trichloro-aniline, 2,3,4,5-tetrachloro-aniline, pentachloroaniline, 4-chloro-2-methylaniline, 2-chloro-4-methyl-aniline, 2,4-dichloro-5-methyl-aniline, 3,4-dichloro-6-methyl-aniline, 2-chloro-4-fluoro-aniline, 4-chloro-2-ethyl-aniline, 4-iodo-2-chloro-aniline, 4-bromo-2-ethylaniline, 4-bromo-2-isopropyl-aniline, 2-chloro-4-difluoromethyl-aniline, 2-chloro-4-trifluoromethyl-aniline, 4-chloro-2-difluoromethyl-aniline, 4-chloro-2-trifluoromethyl-aniline, 4-chloro-3- trifluoro-methyl-aniline and 3-chloro-4-trifluoromethyl-aniline.

The pyrrolidones of formula (III) are either known or can be produced according to known methods.

$R_3$ is preferably hydrogen; when it is alkyl, it is preferably alkyl of 1 to 4 carbon atoms.

When A and B are linked to each other to form a ring, it is preferred that a 6-membered ring is formed. The preferred alkyl and alkenyl groups are those having the appropriate number of carbon atoms to form a 6-membered ring.

Examples of pyrrolidones of formula (III) include: N-propenyl-pyrrolidone, N-isopropenyl-pyrrolidone, N-butenyl-pyrrolidone, N-isobutenyl-pyrrolidone, N-pentenyl-pyrrolidone, N-hexenyl-pyrrolidone, N-(1,2-dimethyl-vinyl)-pyrrolidone, N-(1,2,2-trimethyl-vinyl)-pyrrolidone, N-(1-ethyl-2-methyl-vinyl)-pyrrolidone, N-(1-methyl-2-isopropyl-vinyl)-pyrrolidone, N-(2-isopropyl-vinyl)-pyrrolidone, N-cyclopentenyl-pyrrolidone, N-cyclohexenyl-pyrrolidone, N-(2,2-cyclo-tetramethylene-vinyl)-pyrrolidone, N-(2,2-cyclopentylmethylene-vinyl)-pyrrolidone, 4-(N-pyrrolidonyl-methylene)-cyclohexene and 1-(N-pyrrolidonyl)-butadiene.

N-isobutenyl-pyrrolidone can, for example, be produced be reacting pyrrolidone with isobutyraldehyde under the conditions of an azeotropic distillation, in the presence of acid catalysts, or by splitting off methanol from the corresponding amidal-acetal or by splitting off hydrogen chloride from the corresponding amidal-chloride, as illustrated in the following formula scheme:

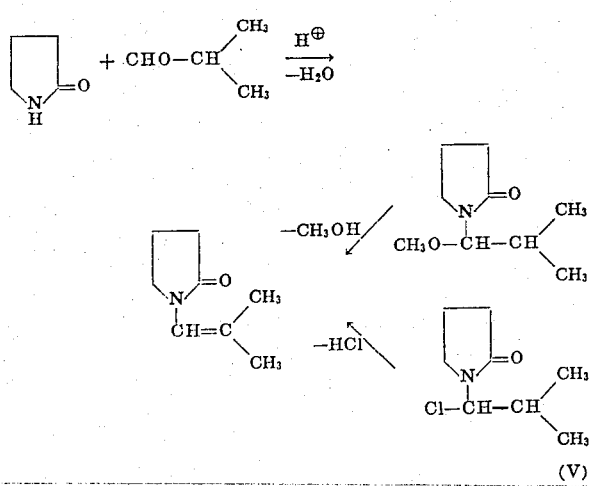

(V)

The reaction of the arylamine with the pyrrolidone derivative can be carried out in the presence of an inert diluent. Suitable diluents are organic solvents, for example aromatic hydrocarbons such as benzene, toluene and xylene, and chlorinated hydrocarbons such as chlorobenzene, O-dichlorobenzene, tetrachloromethane and tetrachloroethylene.

An inorganic acid halide, such as phosphorus oxychloride, phosphorus trichloride, thionyl chloride, phosphorus sulphochloride or phosgene is preferably used as the agent which splits off water.

The reaction temperatures can be varied over a wide range. In general, the reaction is carried out at 10° to 120°, preferably 60° to 100°C.

In carrying out the process, the two starting materials may be used in approximately equimolar amounts and an approximately equimolar amount of the agent which splits off water may be added. The reaction can be carried out in the presence of solvents, but preferably in the absence of any solvents. In general, all reactants are first brought together and the reaction mixture is then heated to higher temperatures, for example 60° –100°C. The reaction is complete when the aniline derivative employed can no longer be detected by diazotisation and coupling. The 2-phenylimino-pyrrolidines may be obtained as salts of hydrohalic acids, which are sparingly soluble in hydrocarbons or halogenated hydrocarbons. They can be isolated as such salts. Preferably, however, the salts produced are dissolved in water at room temperature, preferably a large amount of water, oily, insoluble by-products are removed, and the free bases are precipitated by the addition of aqueous sodium hydroxide solution. The bases can be filtered off as crystalline precipitates, or, if they possess low solidification points, can be extracted with organic solvents, dried and distilled. To prepare any desired salts, the free bases can be reacted with the corresponding acids, for example with inorganic acids such as sulphuric acid, hydrochloric acid or phosphoric acid, or with organic acids such as acetic acid, tartaric acid, citric acid, benzenesulphonic acid and naphthalene-1,5-disulphonic acid.

To prepare the compounds according to the invention, the arylamines of the formula (II) can also be reacted with pyrrolidine derivatives of the formula (VI) or (VII);

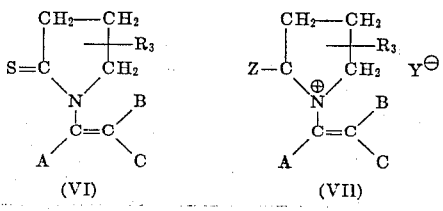

wherein
$R_3$, A, B and C are as above defined,
Z is a reactive ester or ether group and
$Y^\ominus$ is the anion of an inorganic acid.

As examples, there may be mentioned N-isobutenyl-2-thiopyrrolidone, N-isobutenyl-2-ethoxy-pyrrolinium tetrafluoborate, N-isobutenyl-2-methylthiopyrrolinium methosulphate, N-isobutenyl-2-chloropyrrolinium chloride or acetals such as N-isobutenyl-2,2-dimethoxy-pyrrolidine.

The compounds according to the invention can furthermore be obtained by splitting off alcohol or hydrogen halide from compounds of the formula (VIII) or (IX):

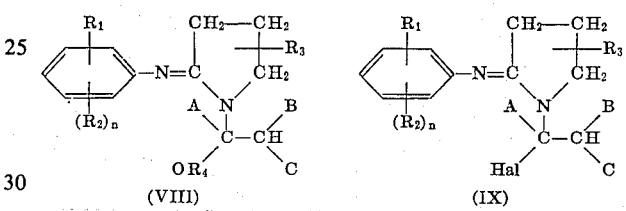

wherein
$R_1$, $R_2$, $R_3$, $n$, A, B and C are as above defined,
$R_4$ is alkyl of 1 to 6 carbon atoms, preferably methyl or ethyl, and
Hal is chlorine or bromine.

Finally, the compounds of the present invention can also be obtained by reacting pyrrolidine derivatives of the formula (X) with aldehydes or ketones of the formula (IX) while splitting off water, for example under the conditions of an azeotropic distillation in the presence of acid catalysts:

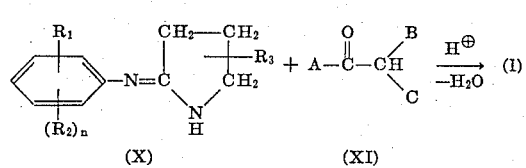

In the formulae (X) and (XI),
$R_1$, $R_2$, $R_3$, $n$, A, B and C are as above defined.

The 2-phenylimino-pyrrolidines as well as their salts display strong acaricidal properties, especially against acarids which as animal ectoparasites attack domesticated animals such as cattle, sheep and rabbits. At the same time, the pryyolidine derivatives generally have only a low toxicity to warm-blooded animals. They are therefore well suited to combating animal ectoparasites of the class acarids.

The compounds of the present invention show a considerably better activity than similar 2-phenylimino-pyrrolidines, such as have been disclosed in Belgian patent No. 734,934.

As economically important, harmful ectoparasites of the class of the acarids, which play a major role especially in tropical and sub-tropical countries, there may be mentioned the Australian and the South American cattle tick, Boophilus microplus, and the South African cattle tick, Boophilus decoloratus, both from the family of the ixodidae. In the same way, representatives of the family of the sarcoptidae can also be combated, such as the rabbit ear mite, Psoroptes cuniculi.

Over the course of time, various ectoparasites, especially ticks, have become resistant to the phosphoric acid esters and carbamates hitherto used for combating them, so that in many areas the success in combating them has become increasingly doubtful. To ensure economical raising of animals in the areas where attack occurs, there is an urgent requirement for agents by means of which all stages of development, that is to say larvae, nymphs, metanymphs and adults, even of resistant strains, for example of the genus Boophilus, can be combated reliably. For example, in Australia the Ridgeland strain and the Biarra strain in Boophilus microplus are highly resistant to the phosphoric acid ester agents hitherto used [see also R. H. Wharton and W. J. Roulston, Annual Review of Entomology, volume 15 (1970), pages 381–404].

The compounds of the present invention are equally active both against the normally sensitive strains and against the resistant strains, for example of Boophilus.

On normal application to the host animal, they both have a direct lethal action on all forms existing as parasites on the animal, and a strong ovicidal action on the adult forms, so that the reproductive cycle of the ticks is interrupted both in the parasite phase on the animal and in the non-parasitic phase. The deposition of eggs is largely stopped and development and hatching inhibited.

The compounds of the present invention can be formulated into acaricidal compositions in the form of solutions, emulsions, suspensions, powders, pastes and granulates. These may be produced according to techniques per se known, for example, by mixing the active compounds with extenders, that is, liquid or solid or liquefied gaseous diluents or carriers, optionally with the use of surface-active agents, that is, emulsifying agents and/or dispersing agents. In the case of the use of water as an extender, organic solvents can, for example, also be used as auxiliary solvents.

As liquid diluents or carriers, there are preferably used aromatic hydrocarbons, such as xylenes, toluene, benzene or alkyl naphthalenes, chlorinated aromatic or aliphatic hydrocarbons, such as chlorobenzenes, chloroethylenes or methylene chloride, aliphatic hydrocarbons, such as cyclohexane or paraffins, for example mineral oil fractions with boiling ranges of 120° –400°C, preferably 180° –300°C, alcohols, such as butanol or glycol as well as their ethers and esters, ketones, such as acetone, methyl ethyl ketone, methyl isobutyl ketone or cyclohexanone, or strongly polar solvents, such as dimethyl formamide, dimethyl sulphoxide, pyrrolidone, N-methyl-pyrrolidone, hexamethylphosphoric acid amide or acetonitrile, as well as water.

By liquefied gaseous diluents or carriers are meant liquids which would be gaseous at normal temperatures and pressures, e.g., aerosol propellants, such as halogenated hydrocarbons, e.g., freon.

As solid diluents or carriers, there are preferably used ground natural minerals, such as kaolins, clays, talc, chalk, quartz, attapulgite, montmorillonite or diatomaceous earth, or ground synthetic minerals, such as highly-dispersed silicic acid, alumina or silicates.

Preferred examples of emulsifying agents include nonionic and anionic emulsifiers, such as polyoxyethylene-fatty acid esters, polyoxyethylene-fatty alcohol ethers, for example alkyl-arylpolyglycol ethers, alkyl sulphonates, alkyl sulphates, quaternary ammonium salts with long chain alkyl moieties and aryl sulphonates; and preferred examples of dispersing agents include lignin, sulphite waste liquors and methyl cellulose.

The acaricidal compositions of the present invention contain 0.1 to 95 percent by weight of active substance, preferably 0.5 to 90 percent by weight.

For application they may be diluted, for example with water. Depending on the form of use, the concentrations can be varied over a wide range and are generally from 10 to 50,000 ppm by weight, preferably 50 to 5,000 ppm.

Application may be effected in the usual manner, for example by spraying, watering or atomizing, or in a bath (dip).

Other additives of active substances, such as disinfectants, can be mixed with the formulations of the ready-to-use solutions.

Aqueous solutions or emulsions of the compounds of the present invention possess good stability under practical conditions, so that they may remain active for up to three months or longer at a pH of 7 – 9.

The present invention also provides a method of combating acarid pests which comprises applying to the acarids or a habitat thereof a compound of the present invention per se or in the form of an acaricidal composition containing as the active ingredient a compound of the present invention in combination with a diluent or carrier.

The present invention also provides a method of protecting or freeing animals from ectoparasites which comprises applying externally to the animals a compound of the invention alone or in admixture with a diluent or carrier.

The following non-limitative examples more particularly illustrate the present invention.

EXAMPLE 1

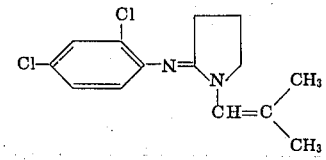

512 g of phosphorus oxychloride are added dropwise to a mixture of 500 g of N-isobutenyl-pyrrolidone and 543 g of 2,4-dichloroaniline at 15°– 20°. Thereafter the mixture is stirred for a further hour at 20° and is then heated to 80° – 85° until no further 2,4-dichloroaniline is detectable in a sample by diazotisation and coupling. Thereafter the batch is introduced into 30 litres of water at 20° – 25°C, with stirring, and the mixture is stirred for one hour until only small amounts of oily material still remain undissolved. After adding active charcoal and a filter aid, the acidic aqueous solution is clarified by filtration and adjusted to pH 8 – 8.5 and 20° – 30°C by dropwise addition of 45 percent strength sodium hydroxide solution. Thereupon the reaction product precipitates in the form of colourless to pale yellowish crystals; if necessary, the mixture is seeded with a small amount of crystalline reaction product. The suspension is stirred for a further 30 minutes and the product is filtered off and rinsed with a large amount of water. After drying in vacuo, the yield is 830 g (87.5 percent of theory), melting point: 50° – 52°C; after recrystallisation from petroleum ether, melting point: 54.5°C. The purity, determined by gas chromatography, is 98 – 100 percent. The compound can be distilled and has a boiling point at a pressure of 0.2 mm Hg of 155° – 158°C.

The 2-arylimino-1-alkylvinyl-pyrrolidines of Examples 2–34 are analogously produced from the appropriate N-alkylvinyl-pyrrolidone and the arylamine.

| Ex. No. | Formulae of Examples 2–34 | Physical constants |
|---|---|---|
| 2 | [structure] | Boiling point 168 to 172° C./0.2 mm. Hg. |
| 3 | [structure] | Boiling point 162 to 166° C./0.4 mm. Hg. |
| 4 | [structure] | Boiling point 165 to 169° C./0.3 mm. Hg. |
| 5 | [structure] | Boiling point 171 to 176° C./0.3 mm. Hg. |
| 6 | [structure] | Boiling point 172 to 176° C./0.3 mm. Hg. |
| 7 | [structure] | Boiling point 172 to 176° C./1.0 mm. Hg. |
| 8 | [structure] | Boiling point 162 to 166° C./0.3 mm. Hg. |
| 9 | [structure] | Boiling point 157 to 162° C./0.4 mm. Hg. |
| 10 | [structure] | Boiling point 158 to 162° C./0.3 mm. Hg. |
| 11 | [structure] | Boiling point 172 to 176° C./0.3 mm. Hg. |
| 12 | [structure] | Boiling point 139 to 143° C./0.3 mm. Hg. |
| 13 | [structure] | Boiling point 151 to 156° C./0.2 mm. Hg. |
| 14 | [structure] | Boiling point 162 to 165° C./0.2 mm. Hg. |
| 15 | [structure] | Boiling point 157 to 163° C./0.3 mm. Hg. |
| 16 | [structure] | Boiling point 140 to 143° C./0.2 mm. Hg. |
| 17 | [structure] | Boiling point 139 to 142° C./0.2 mm. Hg. |
| 18 | [structure] | Boiling point 167 to 171° C./0.3 mm. Hg. |
| 19 | [structure] | Boiling point 158–164°/0.5 mm. Hg. |
| 20 | [structure] | Boiling point 152–157°/0.3 mm. Hg. |
| 21 | [structure] | Boiling point 158–168°/0.3 mm. Hg. |

| Ex. No. | Formulae of Examples 2-34 | Physical constants |
|---|---|---|
| 22 | (structure: 4-Cl, 2-CH₃ phenyl-N=pyrrolidine, CH=CH-C₂H₅) | Oil. |
| 23 | (2,6-diCl phenyl-N=pyrrolidine, CH=C(CH₃)₂) | Boiling point 162–166°/0.7 mm. Hg. |
| 24 | (3-Br, 5-Cl phenyl-N=pyrrolidine, CH=C(CH₃)₂) | Boiling point 170–181°/0.4 mm. Hg. |
| 25 | (4-Cl phenyl-N=pyrrolidine, CH=C(CH₃)(C₂H₅)) | Boiling point 159–163°/0.3 mm. Hg. |
| 26 | (2,3-diCl phenyl-N=pyrrolidine, CH=C(CH₃)(C₂H₅)) | Boiling point 158–163°/0.4 mm. Hg. |
| 27 | (3,4-diCl phenyl-N=pyrrolidine, CH=C(CH₃)(C₂H₅)) | Boiling point 175–179°/0.3 mm. Hg. |
| 28 | (2,4-diCl phenyl-N=pyrrolidine, CH=C(C₂H₅)₂) | Boiling point 172–175°/0.5 mm. Hg. |
| 29 | (2,4-diCl phenyl-N=pyrrolidine, CH=C(C₂H₅)₂) | Boiling point 172–177°/0.2 mm. Hg. |
| 30 | (4-Cl phenyl-N=pyrrolidine, CH=C(C₂H₅)₂) | Boiling point 161–165°/0.2 mm. Hg. |
| 31 | (2,3-diCl phenyl-N=pyrrolidine, CH=C(C₂H₅)₂) | Boiling point 168–173°/0.2 mm. Hg. |
| 32 | (4-Cl, 2-CH₃ phenyl-N=pyrrolidine, CH=C(C₂H₅)₂) | Boiling point 164–168°/0.2 mm. Hg. |
| 33 | (4-Cl, 3-Br phenyl-N=pyrrolidine, CH=C(C₂H₅)₂) | Boiling point 171–176°/0.4 mm Hg. |
| 34 | (4-Cl, 3-CH₃ phenyl-N=pyrrolidine, CH=C(C₂H₅)₂) | Boiling point 173–178°/0.5 mm. Hg. |

EXAMPLE 35

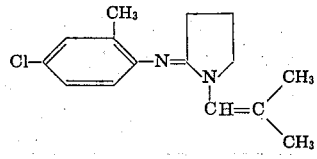

738 g of 2-methyl-4-chloro-aniline hydrochloride (97.8 percent strength) are introduced into 618 g of N-isobutenyl-pyrrolidone at 15° – 20°C. Thereafter, 660 g of phosphorus oxychloride are added dropwise at 15° – 20°C, with slight cooling. The mixture is then stirred for a further hour at 20°C and is warmed to 80°C in the course of one hour. In the course thereof, a vigorous evolution of hydrogen chloride starts. The mixture is stirred for approximately a further hour at 80° – 85°C, until 2-methyl-4-chloro-aniline is no longer detectable by diazotisation and coupling. The batch is allowed to cool somewhat, and the viscous melt is poured into 30 litres of water at 20° – 25°C, while stirring well. After one hour, all has dissolved apart from small amounts of oil by-products. Active charcoal and filtration aid are added and the acid solution of the reaction product is clarified by filtration. 45 percent strength sodium hydroxide solution is added dropwise to the filtrate at 20° – 25°C, while stirring well and cooling, until pH 8.5 is reached. The reaction product precipitates in the form of a pale yellowish-coloured crystalline suspension; seeding is used if necessary. After completion of the precipitation, the mixture is stirred for a further 30 minutes at 20° and the crystalline product is filtered off and washed with a large amount of water. After drying in vacuo, the yield is 920 g (86.5 g of theory). Melting point: 68° – 70°C; after recrystallisation from petroleum ether, melting point: 71° – 72°C. The purity of the crude product, determined by gas chromatography, is 98 – 99.5 percent.

EXAMPLE 36

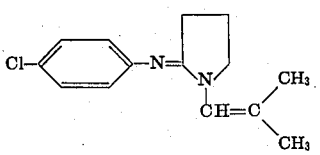

100 g of 4-chloroaniline and 126 g of N-isobutenyl-pyrrolidone are dissolved in 800 ml of benzene and 132 g of phosphorus oxychloride are added dropwise at 20°C, with stirring. Thereafter the mixture is heated to reflux in the course of one hour and is kept refluxing for 1 – 2 hours, until 4-chloroaniline is no longer detectable in a sample by diazotisation and coupling. Thereafter the batch, from which the reaction product has precipitated as a lower oily layer, is pured into 5 litres of ice water and 300 ml of 45 percent strength sodium hydroxide solution, whilst stirring. The benzene layer is separated off and dried over potassium carbonate, the solvent is distilled off and the reaction product is fractionated in vacuo: boiling point₀.₃ ₘₘ: 158°–162°C; yield 173 g (81 percent of theory).

The compounds of Examples 37–39 are analogously produced from the appropriate N-substituted pyrrolidones and arylamines.

| Ex. No. | Formulae of Examples 37–39 | Physical constants |
|---|---|---|
| 37 | 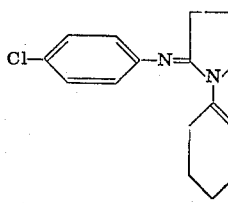 | Boiling point 168 to 171° C./0.3 mm. Hg. |
| 38 | 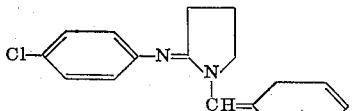 | Boiling point 175 to 179° C./0.1° mm. Hg. |
| 39 | 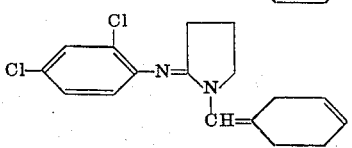 | Boiling point 185 to 190° C./0.05 mm. Hg. |

The compounds of Examples 40–56 are analogously produced from the appropriate N-substituted pyrrolidones and arylamines.

| Ex. No. | Formulae of Examples 40–56 | Physical constants |
|---|---|---|
| 40 | 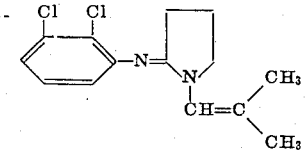 | Boiling point₀.₃ ₘₘ.: 155–158°. |
| 41 | 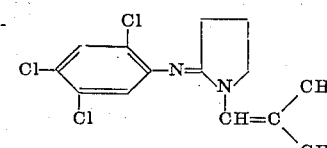 | Boiling point₀.₃ ₘₘ.: 168–172°. |
| 42 | 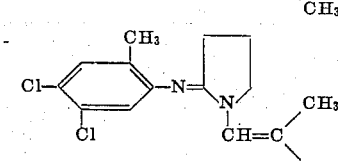 | Boiling point₀.₃ ₘₘ.: 167–172°. |
| 43 | 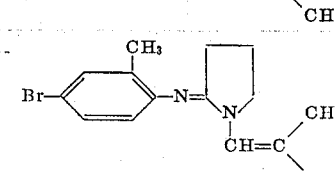 | Boiling point₀.₃ ₘₘ.: 155–159°. |
| 44 | 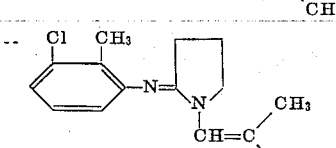 | Boiling point₀.₃ₘₘ.: 158 to 163° C. |
| 45 | 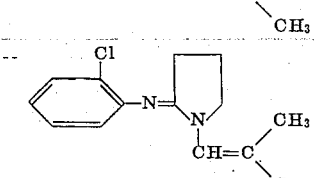 | Boiling point₀.₃ ₘₘ.: 156 to 161° C. |
| 46 | 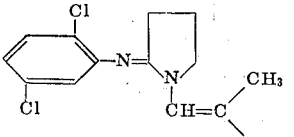 | Boiling point₀.₃ ₘₘ.: 165 to 171° C. |
| 47 | 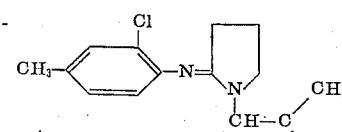 | Boiling point₀.₃ ₘₘ.: 153 to 156° C. |
| 48 | 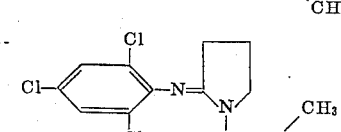 | Boiling point₀.₃ ₘₘ.: 153 to 156° C. |
| 49 | 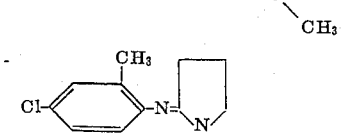 | Boiling point₀.₂ ₘₘ.: 145 to 147° C. |
| 50 | 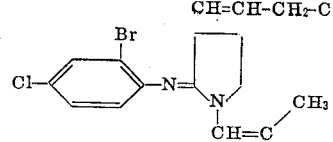 | Boiling point 172–180°/0.5 mm. Hg. |
| 51 | 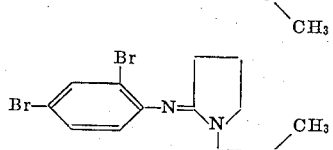 | Boiling point 175–180°/0.15 mm. Hg. |
| 52 | 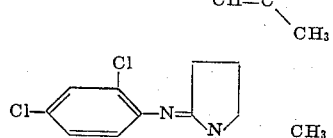 | Boiling point 163–166°/0.3 mm. Hg. |
| 53 | 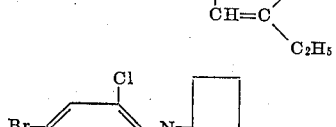 | Boiling point 165–174°/0.2 mm. Hg. |
| 54 | 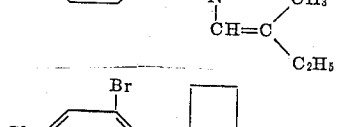 | Boiling point 162–168°/0.2 mm. Hg. |
| 55 | 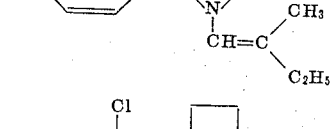 | Boiling point 175–180°/0.2 mm. Hg. |
| 56 | 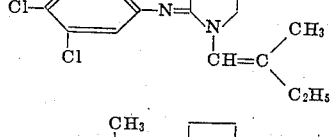 | Boiling point 164–169°/0.3 mm. Hg. |

In vitro test of ovicidal action on ticks 3 g of each active substance to be tested are mixed with 7 g of a mixture of equal parts by weight of ethylene glycol monomethyl ether and nonylphenyl polyglycol ether. The emulsion concentrate thus obtained is diluted with water to the particular desired use concentration.

Adult fully bloated female ticks of the variety Boophilus microplus (resistant) are dipped for one minute into this active substance preparation. After dipping 10 female specimens of each of the various tick strains, the individual ticks are transferred into plastic dishes, the base of which is covered with a disc of filter paper.

After 35 days the activity of each active substance preparation is determined by assessing the inhibition of deposition of fertile eggs, as compared to the deposition of eggs by untreated control ticks. The action is indicated in percent: 100 percent means that no further fertile eggs were deposited and 50 percent means that the ticks have laid half the number of eggs laid by the untreated control ticks.

Table A sets forth the results from two representative compounds of Belgian patent No. 734,934, while Table B sets forth the results from representative compounds of the present invention.

TABLE A.—IN VITRO TEST FOR OVICIDAL ACTION ON TICKS

| Source of active substance— | Active substance | Physical constants | Ovicidal action against Boophilus, Biarra strain | |
|---|---|---|---|---|
| | | | 100% inhibition at— | >50% inhibition at— |
| | | | the indicated active substance concentration (percent by weight) | |
| According to Belgian Patent 734,934 | 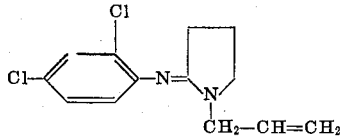 Example 2. | Boiling point $_{0.8\ mm.}$: 160–164° | 0.1 | 0.0 |
| | 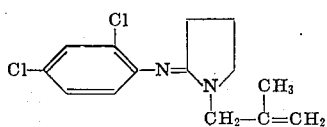 Example 73. | Boiling point $_{0.2\ mm.}$: 156–162° | 0.03 | 0.01 |

TABLE B.—IN VITRO TEST FOR OVICIDAL ACTION ON TICKS

| Compounds of the present Invention | Active substance | Physical constants | Ovicidal action against Boophilus, Biarra strain | |
|---|---|---|---|---|
| | | | 105% inhibition at— | >50% inhibition at— |
| | | | The indicated active substance concentration (percent by weight) | |
| Example 1 | 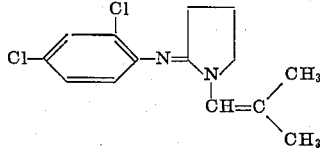 | Melting point: 54.5° C. Boiling point $_{0.2\ mm.}$: 155–158° | 0.003 | 0.001 |
| Example 35 | 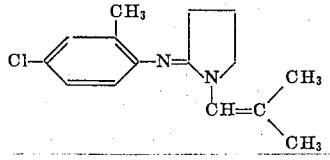 | Melting point: 71–72° C. | 0.01 | 0.003 |
| Example 40 | 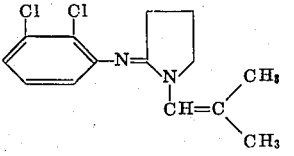 | Boiling point $_{0.3\ mm.}$: 155–158° | 0.01 | 0.003 |
| Example 41 | 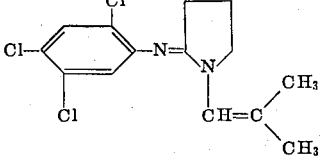 | Boiling point $_{0.3\ mm.}$: 168–172° | 0.01 | 0.003 |

TABLE B.—IN VITRO TEST FOR OVICIDAL ACTION ON TICKS —Continued

| Compounds of the present Invention | Active substance | Physical constants | Ovicidal action against Boophilus, Biarra strain | |
|---|---|---|---|---|
| | | | 105% inhibition at— | >50% inhibition at— |
| | | | The indicated active substance concentration (percent by weight) | |
| Example 42 | 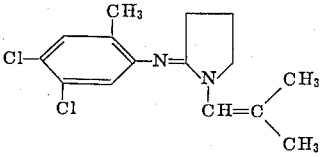 | Boiling point $_{0.3\ mm.}$: 167–172° | 0.03 | 0.01 |
| | | | At a concentration of 0.0003% the compound has a 100% lethal effect on tick larvae | |
| Example 43 | 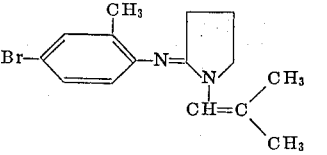 | Boiling point $_{0.3\ mm.}$: 155–159° | 0.01 | 0.005 |
| Example 44 | 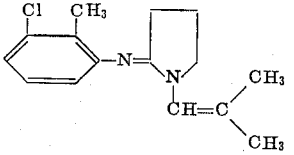 | Boiling point $_{0.3\ mm.}$: 158 to 163° C | 0.01 | 0.005 |
| Example 36 | 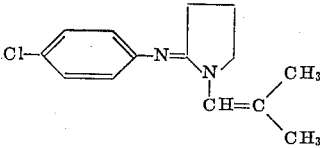 | Boiling point $_{0.3\ mm.}$: 158 to 162° C | 0.03 | 0.02 |
| Example 45 | 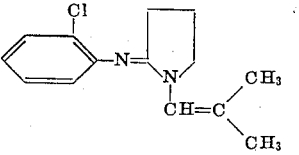 | Boiling point $_{0.3\ mm.}$: 156 to 161° C | 0.03 | 0.02 |
| Example 46 | 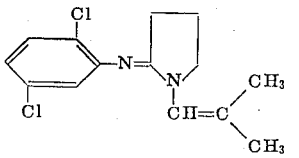 | Boiling point $_{0.3\ mm.}$: 165 to 171° C | 0.03 | 0.01 |
| Example 47 | 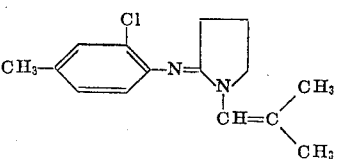 | Boiling point $_{0.3\ mm.}$: 153 to 156° C | 0.03 | 0.02 |
| Example 48 | 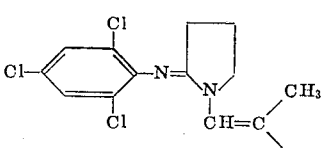 | Boiling point $_{0.3\ mm.}$: 160 to 164° C | 0.03 | 0.02 |
| Example 49 | 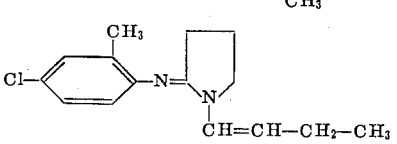 | Boiling point $_{0.2\ mm.}$: 145 to 147° C | 0.003 | 0.002 |
| Example 50 | 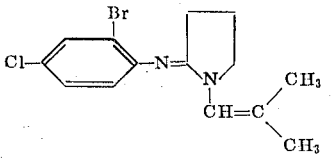 | Boiling point 172–180°/0.5 mm. Hg | 0.01 | 0.005 |

TABLE B.—IN VITRO TEST FOR OVICIDAL ACTION ON TICKS—Continued

| Compounds of the present Invention | Active substance | Physical constants | Ovicidal action against Boophilus, Biarra strain | |
|---|---|---|---|---|
| | | | 105% inhibition at— | >50% inhibition at— |
| | | | The indicated active substance concentration (percent by weight) | |
| Example 51 | (Br, Br-phenyl)-N=C-pyrrolidine, CH=C(CH₃)(CH₃) | Boiling point 175–180°/0.15 mm. Hg | 0.01 | 0.003 |
| Example 52 | (Cl, Cl-phenyl)-N=C-pyrrolidine, CH=C(CH₃)(C₂H₅) | Boiling point 163–166°/0.3 mm. Hg | 0.01 | 0.003 |
| Example 53 | (Cl, Br-phenyl)-N=C-pyrrolidine, CH=C(CH₃)(C₂H₅) | Boiling point 165–174°/0.2 mm. Hg | 0.03 | 0.01 |
| Example 54 | (Br, Cl-phenyl)-N=C-pyrrolidine, CH=C(CH₃)(C₂H₅) | Boiling point 162–168°/0.2 mm. Hg | 0.03 | 0.01 |
| Example 55 | (Cl, Cl, Cl-phenyl)-N=C-pyrrolidine, CH=C(CH₃)(C₂H₅) | Boiling point 175–180°/0.2 mm. Hg | 0.03 | 0.01 |
| Example 56 | (CH₃, Cl-phenyl)-N=C-pyrrolidine, CH=C(CH₃)(C₂H₅) | Boiling point 164–169°/0.3 mm. Hg | 0.01 | 0.003 |

What is claimed is:

1. A compound of the formula:

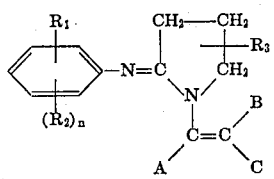

or a salt thereof, wherein
   $R_1$ is halogen,
   $R_2$ is hydrogen, halogen, alkyl of 1 to 6 carbon atoms, difluoromethyl or trifluoromethyl,
   $R_3$ is hydrogen or lower alkyl,
   $n$ is an integer from 1 to 4, and
   A, B and C each represent hydrogen, alkyl of 1 to 6 carbon atoms, alkenyl of 2 to 6 carbon atoms, or A and B, or B and C, are linked to each other to form a ring, provided that, at least one of A, B and C is alkyl or alkenyl.

2. A compound according to claim 1, wherein $R_1$ is chlorine, bromine or fluorine, $R_2$ is hydrogen, chlorine, bromine, fluorine, methyl, ethyl, difluoromethyl or trifluoromethyl, and $R_3$ is hydrogen or alkyl of 1 to 4 carbon atoms.

3. A compound according to claim 2, wherein
   $R_1$ is chlorine or bromine,
   $R_2$ is hydrogen, chlorine, bromine, methyl, ethyl or trifluoromethyl,
   $R_3$ is hydrogen,
   $n$ is 1 or 2, and
   A, B and C each represent hydrogen, methyl or ethyl, or A and B, or B and C are alkyl or alkenyl linked to each other to form a 6-membered ring, provided that, at least one of A, B and C is alkyl or alkenyl.

4. The compound according to claim 1 which is

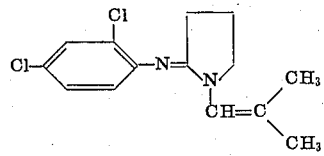

5. The compound according to claim 1 which is

[structure: 3,4-dichlorophenyl-N=C(pyrrolidine)-CH=C(CH₃)₂]

6. The compound according to claim 1 which is

[structure: 4-chloro-3-methylphenyl-N=C(pyrrolidine)-CH=C(CH₃)₂]

7. The compound according to claim 1 which is

[structure: 4-methyl-3-chlorophenyl-N=C(pyrrolidine)-CH=C(CH₃)₂]

8. The compound according to claim 1 which is

[structure: 4-bromo-3-methylphenyl-N=C(pyrrolidine)-CH=C(CH₃)₂]

9. The compound according to claim 1 which is

[structure: 4-methyl-3-bromophenyl-N=C(pyrrolidine)-CH=C(CH₃)₂]

10. The compound according to claim 1 which is

[structure: 4-bromo-2-ethylphenyl-N=C(pyrrolidine)-CH=C(CH₃)₂]

11. The compound according to claim 1 which is

[structure: 4-trifluoromethyl-3-chlorophenyl-N=C(pyrrolidine)-CH=C(CH₃)₂]

12. The compound according to claim 1 which is

[structure: 2-chlorophenyl-N=C(pyrrolidine)-CH=C(CH₃)₂]

13. The compound according to claim 1 which is

[structure: 2-chloro-5-methylphenyl-N=C(pyrrolidine)-CH=C(CH₃)₂]

14. The compound according to claim 1 which is

[structure: 2-chloro-4-chloro-5-methylphenyl-N=C(pyrrolidine)-CH=C(CH₃)₂]

15. The compound according to claim 1 which is

[structure: 2-methyl-6-chlorophenyl-N=C(pyrrolidine)-CH=C(CH₃)₂]

16. The compound according to claim 1 which is

[structure: 2-methyl-4-chlorophenyl-N=C(pyrrolidine)-CH=C(CH₃)₂]

17. The compound according to claim 1 which is

[structure: 3,4-dichlorophenyl-N=C(pyrrolidine)-CH=CH-C₂H₅]

18. The compound according to claim 1 which is

[structure: 4-methyl-3-chlorophenyl-N=C(pyrrolidine)-CH=CH-C₂H₅]

19. The compound according to claim 1 which is

[structure: 2-chloro-4-chlorophenyl-N=C(pyrrolidine)-CH=CH-CH₃]

20. The compound according to claim 1 which is

[structure: 2-methyl-4-chlorophenyl-N=C(pyrrolidine)-CH=CH-CH₃]

21. The compound according to claim 1 which is

21

[Structure: 2-bromo-4-chloro-phenyl-N=C(pyrrolidine)-with H₃C-C=CH-CH₃]

22. The compound according to claim 1 which is

[Structure: 4-chloro-phenyl(3-CH₃)-N=C(pyrrolidine)-CH=CH-C₂H₅]

23. The compound according to claim 1 which is

[Structure: 2,3-dichlorophenyl-N=C(pyrrolidine)-CH=CH-C₂H₅]

24. The compound according to claim 1 which is

[Structure: 2,4,5-trichlorophenyl-N=C(pyrrolidine)-CH=CH-C₂H₅]

25. The compound according to claim 1 which is

[Structure: 2-methyl-4,5-dichlorophenyl-N=C(pyrrolidine)-CH=CH-C₂H₅]

26. The compound according to claim 1 which is

[Structure: 2,6-dichlorophenyl-N=C(pyrrolidine)-CH=C(CH₃)₂]

27. The compound according to claim 1 which is

[Structure: 4-bromo-2-chlorophenyl-N=C(pyrrolidine)-CH=C(CH₃)₂]

28. The compound according to claim 1 which is

[Structure: 4-chlorophenyl-N=C(pyrrolidine)-CH=C(CH₃)(C₂H₅)]

29. The compound according to claim 1 which is

[Structure: 2,3-dichlorophenyl-N=C(pyrrolidine)-CH=C(CH₃)(C₂H₅)]

30. The compound according to claim 1 which is

[Structure: 3,4-dichlorophenyl-N=C(pyrrolidine)-CH=C(CH₃)(C₂H₅)]

31. The compound according to claim 1 which is

[Structure: 2,4-dichlorophenyl-N=C(pyrrolidine)-CH=C(C₂H₅)₂]

32. The compound according to claim 1 which is

[Structure: 2,5-dichlorophenyl-N=C(pyrrolidine)-CH=C(C₂H₅)₂]

33. The compound according to claim 1 which is

[Structure: 4-chlorophenyl-N=C(pyrrolidine)-CH=C(C₂H₅)₂]

34. The compound according to claim 1 which is

[Structure: 2,3-dichlorophenyl-N=C(pyrrolidine)-CH=C(C₂H₅)₂]

35. The compound according to claim 1 which is

[Structure: 4-chloro-2-methylphenyl-N=C(pyrrolidine)-CH=C(C₂H₅)₂]

36. The compound according to claim 1 which is

[Structure: 4-chloro-3-bromophenyl-N=C(pyrrolidine)-CH=C(C₂H₅)₂]

37. The compound according to claim 1 which is

[Structure: 4-chloro-3-methylphenyl-N=C(pyrrolidine)-CH=C(C₂H₅)₂]

38. The compound according to claim 1 which is

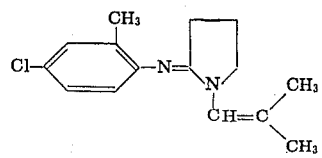

39. The compound according to claim 1 which is

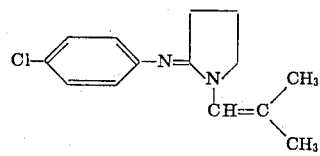

40. The compound according to claim 1 which is

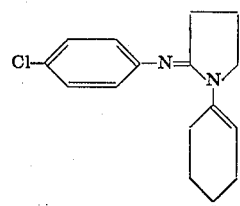

41. The compound according to claim 1 which is

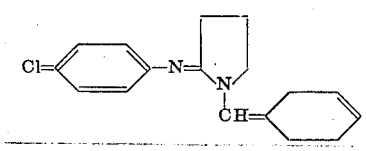

42. The compound according to claim 1 which is

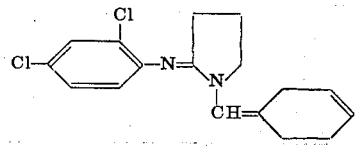

43. The compound according to claim 1 which is

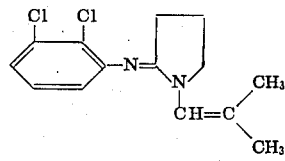

44. The compound according to claim 1 which is

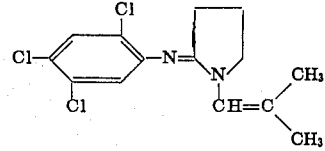

45. The compound according to claim 1 which is

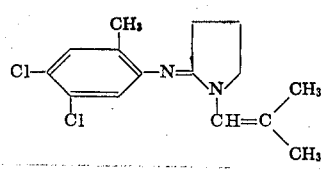

46. The compound according to claim 1 which is

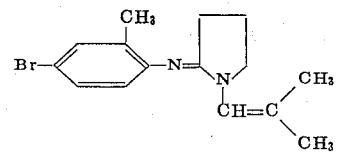

47. The compound according to claim 1 which is

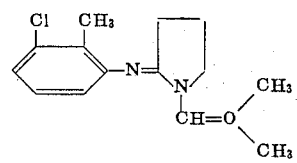

48. The compound according to claim 1 which is

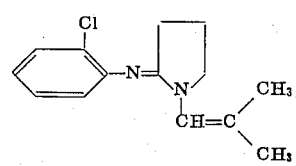

49. The compound according to claim 1 which is

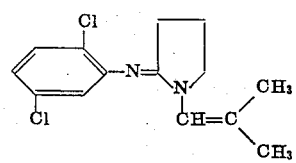

50. The compound according to claim 1 which is

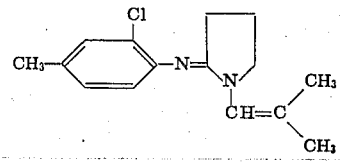

51. The compound according to claim 1 which is

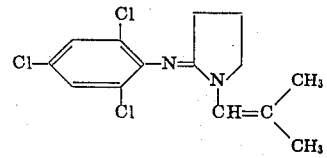

52. The compound according to claim 1 which is

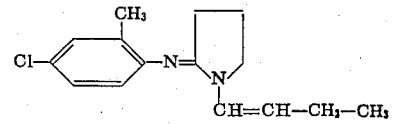

53. The compound according to claim 1 which is

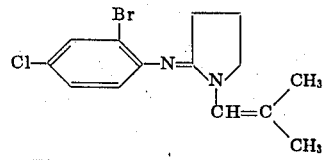

54. The compound according to claim 1 which is
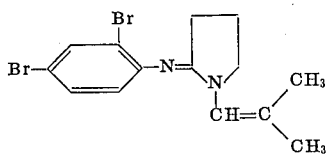
55. The compound according to claim 1 which is
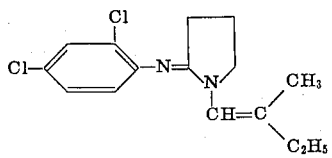
56. The compound according to claim 1 which is
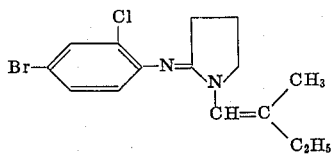
57. The compound according to claim 1 which is
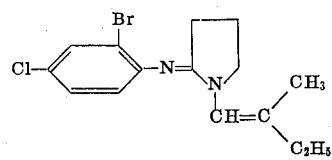
58. The compound according to claim 1 which is
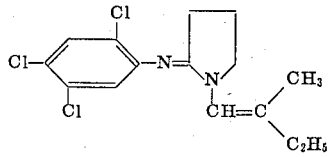
59. The compound according to claim 1 which is
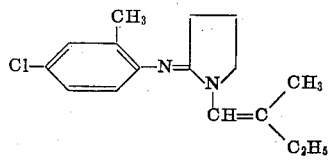
* * * * *